(12) United States Patent
Matumoto

(10) Patent No.: US 6,461,006 B1
(45) Date of Patent: Oct. 8, 2002

(54) MEASURING INSTRUMENT WITH AN INDICATOR

(75) Inventor: Makoto Matumoto, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/635,173

(22) Filed: Aug. 8, 2000

(30) Foreign Application Priority Data

Sep. 1, 1999 (JP) ............................................. 11-247698

(51) Int. Cl.⁷ ............................................... G01D 11/28
(52) U.S. Cl. ............................ 362/27; 362/26; 362/30; 362/489
(58) Field of Search ............................ 362/26, 27, 23, 362/489, 29, 85, 30; 116/286, 287, 288

(56) References Cited

U.S. PATENT DOCUMENTS

| | | | |
|---|---|---|---|
| 5,839,811 A | * 11/1998 | Shamura | 362/30 |
| 5,911,492 A | * 6/1999 | Perry | 362/26 |
| 6,025,820 A | * 2/2000 | Salmon | 345/75.1 |

FOREIGN PATENT DOCUMENTS

| | | |
|---|---|---|
| EP | 0602385 | 6/1994 |
| EP | 0756967 | 2/1997 |
| JP | 9-21655 | 1/1997 |

OTHER PUBLICATIONS

U.S. patent application Ser. No. 09/479,923, Matsumoto, filed Jan. 10, 2000.
U.S. patent application Ser. No. 09/577,122, Matumoto, filed May 24, 2000.

* cited by examiner

Primary Examiner—Sandra O'Shea
Assistant Examiner—Hargobind S. Sawhney
(74) Attorney, Agent, or Firm—Law Offices of David G. Posz

(57) ABSTRACT

A display is provided having five light-emitting elements, constituting a first light source, are provided on the surface of a wiring board. These sources illuminate a graduated board and a light-emitting indicator. A single light-emitting element, constituting a second light source, is provided on the surface of the wiring board as an illumination light source for use on the graduated board so as to oppose a concave portion of the light-guiding plate via the opening portion of the holder on an outside of one of the respective light-emitting elements.

10 Claims, 3 Drawing Sheets

MEASURING INSTRUMENT WITH AN INDICATOR

CROSS-REFERENCE TO RELATED APPLICATION

The present invention is related to Japanese patent application No. Hei. 11-247698, filed Sep. 1, 1999; the contents of which are incorporated herein by reference.

FIELD OF THE INVENTION

The present invention relates to a measuring instrument, and more particularly, the present invention relates to a measuring instrument with an indicator.

BACKGROUND OF THE INVENTION

Conventionally, for example, measuring instrument indicators are used, such as for an automobile, such as the one illustrated in JP-A-9-21655. Here, a light-emitting indicator is supported at its rotating base by a forward end of an indicator shaft that passes through a through-hole of a graduated board and a light-guiding plate. These items are concurrently disposed on a reverse surface of this graduated board and extend from a rotating machine. Also, a plurality of light-emitting elements, constituting a light source, are disposed around the indicator shaft at positions corresponding to the rotating base of the light-emitting indicator on a reverse surface side of the light-guiding plate. These light-emitting elements provide light into the light-emitting indicator through the respective through-hole of the light-guiding plate and graduated board, from the rotating base portion thereof. At the same time, light enters the light-guiding plate from the through-hole from this same source.

However, in the above-described device, light from each respective light-emitting element is incident upon both the light-emitting indicator and the light-guiding plate. As such, even though light incident upon the light-emitting indicator is sufficient, light incident upon the graduated board from the light-guiding plate through the reverse surface is insufficient. As a result, the graduated board has reduced brightness. The present invention was developed in light of these drawbacks.

SUMMARY OF THE INVENTION

The present invention overcomes these and other drawbacks by providing a measuring instrument with an indicator having light-transmitting graduated boards, a light-guiding plate provided along a reverse surface of the graduated board, a rotating inside machine provided on a reverse-surface side of the light-guiding plate and having an indicator shaft passing through a through-hole of the light-guiding plate and a through-hole of the graduated board. The measuring instrument further has light-emitting indicators supported at a forward end portion of the indicator shaft by a rotating base portion so as to rotate along a surface of the graduated board. A first light source is disposed on a reverse-surface side of the light-guiding plate around the indicator shaft which causes the light to enter the light-emitting indicator from the rotating base portion through the respective through-hole portions and causes the light to enter the graduated board through the light-guiding plate.

a second light source is disposed at a position spaced from the indicator shaft from the first light source in the radial direction and arranged to cause the light to enter the graduated board through the light-guiding plate.

As a result, the first light source illuminates the light-emitting indicator and the graduated board. The second light source illuminates only the graduated board 20a. Accordingly, even when light from the first light source on the graduated board is insufficient compared to light from the first light source on the light-emitting indicator, the second light source compensates for this insufficiency. As a result, the graduated board as well as the light-emitting indicator are properly illuminated.

In another aspect of the present invention, a black face is provided on the graduated board via an annular end plate to oppose the surface of the graduated board and light-emitting element.

In another aspect of the invention, a first light source is a plurality of light-emitting elements disposed around the indicator shaft at substantially equal distances from the indicator shaft in the radial direction. A second light source is provided which is a single light-emitting element.

In a further aspect of the invention, the measuring instrument has a wiring board provided along a reverse surface of the light-guiding plate. The first light source is a plurality of light-emitting elements provided on the wiring board and electrically connected to this wiring board and the second light source is. a single light-emitting element provided on said wiring board and electrically connected to this wiring board, and the rotating inside machine is electrically connected to the wiring board.

In another aspect of the invention, the light-guiding plate is equipped, on an opposite surface, with a concavity portion opposing the light-emitting element constituting the second light source. The second light source causes the light to enter the concavity portion before the light enters the graduated board through the light-guiding plate.

In another aspect of the invention, the first light source is a plurality of light-emitting diodes radially disposed around the indicator shaft at substantially equal distances from the indicator shaft. The second light source is a light-emitting diode.

In another aspect of the invention, a wiring board is provided along a reverse surface of the light-guiding plate, and the respective light-emitting elements are light-emitting diodes provided on the wiring board and electrically connected to the wiring board along with the rotating inside machine.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE INVENTION

Figure 1:
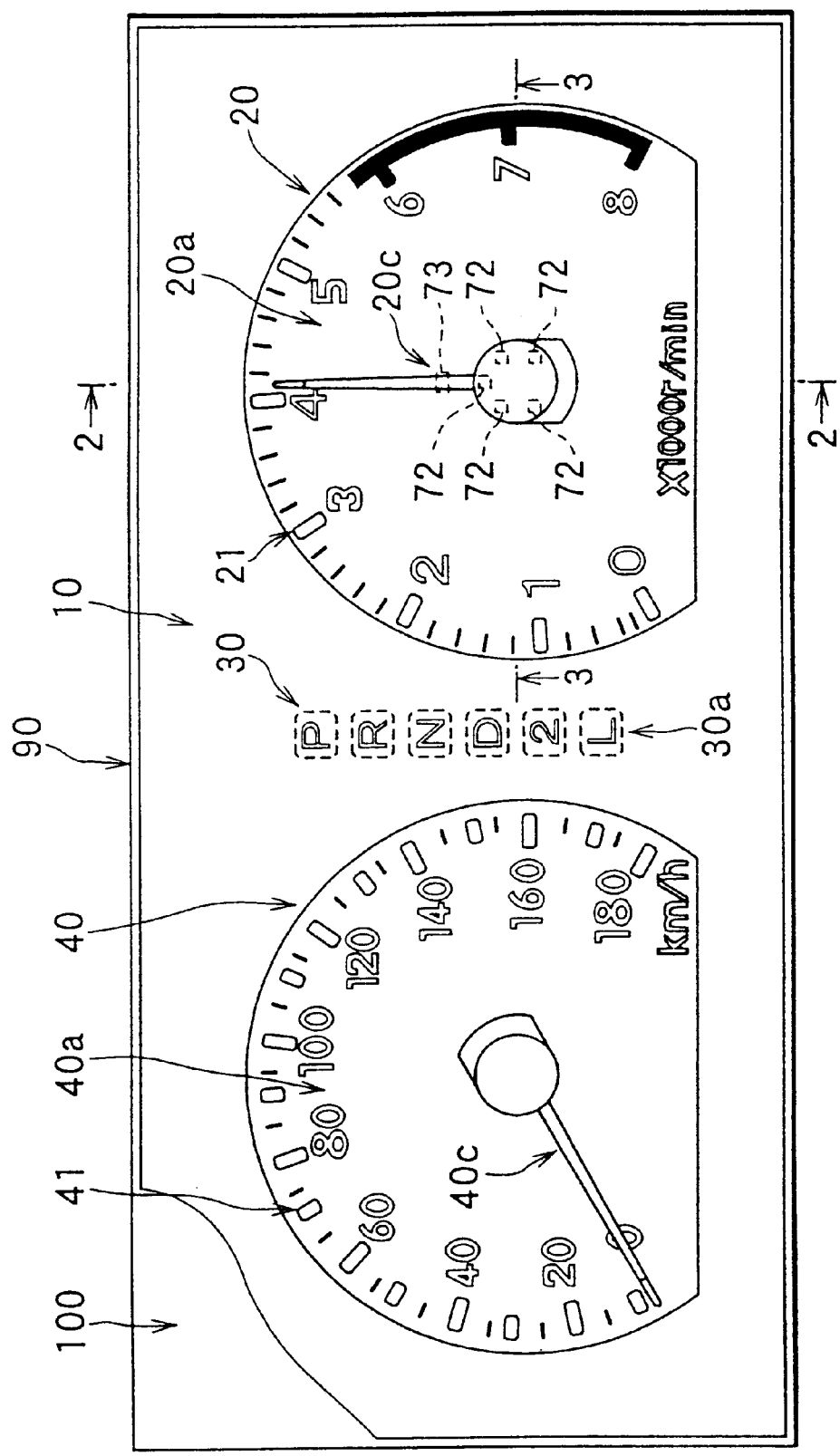
FIG. 1 is a front view of a measuring instrument with an indicator according to the present invention.
Figure 2:
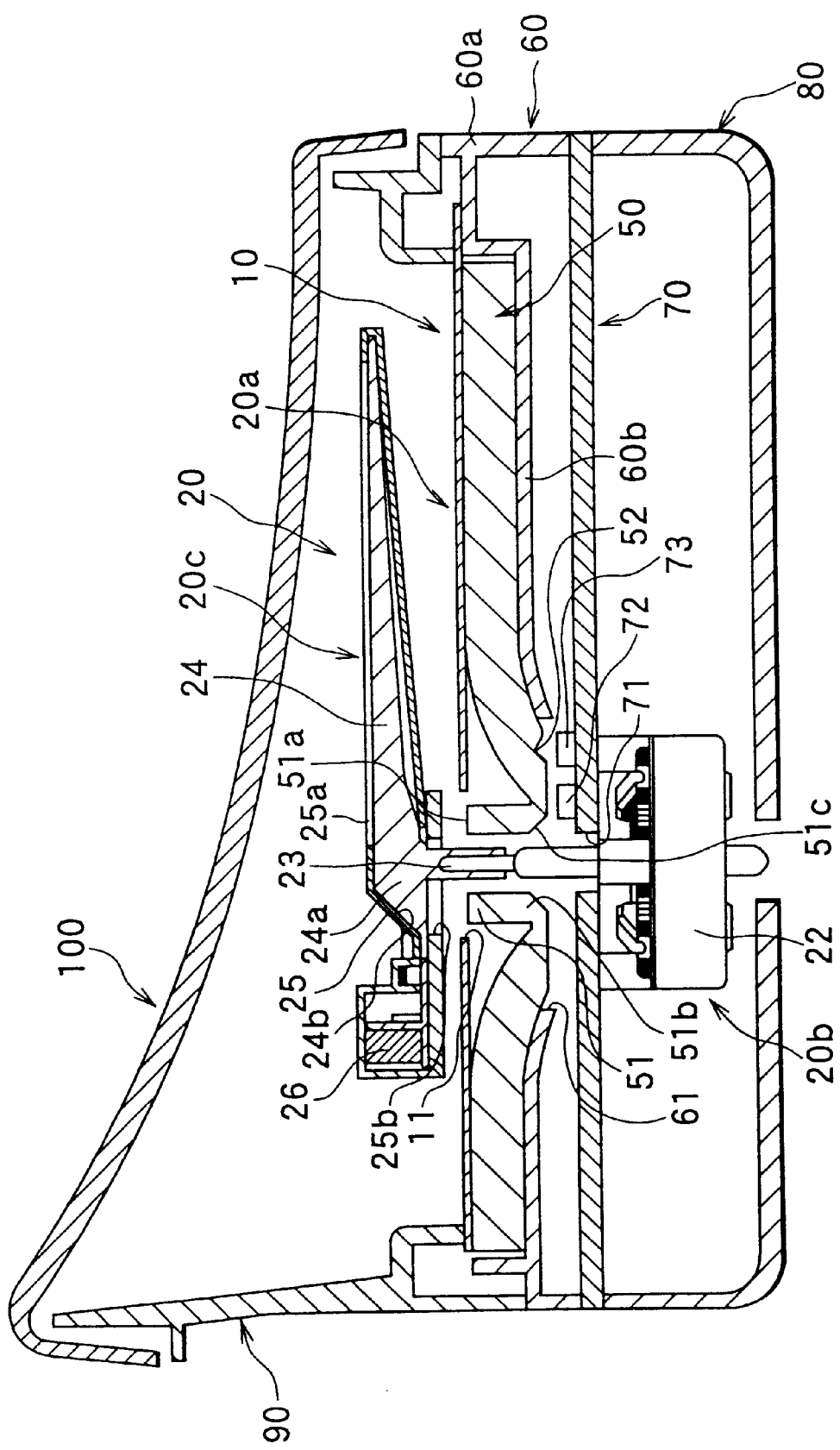
FIG. 2 is a sectional view taken along the line 2—2 of FIG. 1 of a measuring instrument with an indicator according to the present invention; and, FIG. 3 is a sectional view taken along the line 3—3 of FIG. 1 of a measuring instrument with an indicator according to the present invention.
Figure 3:
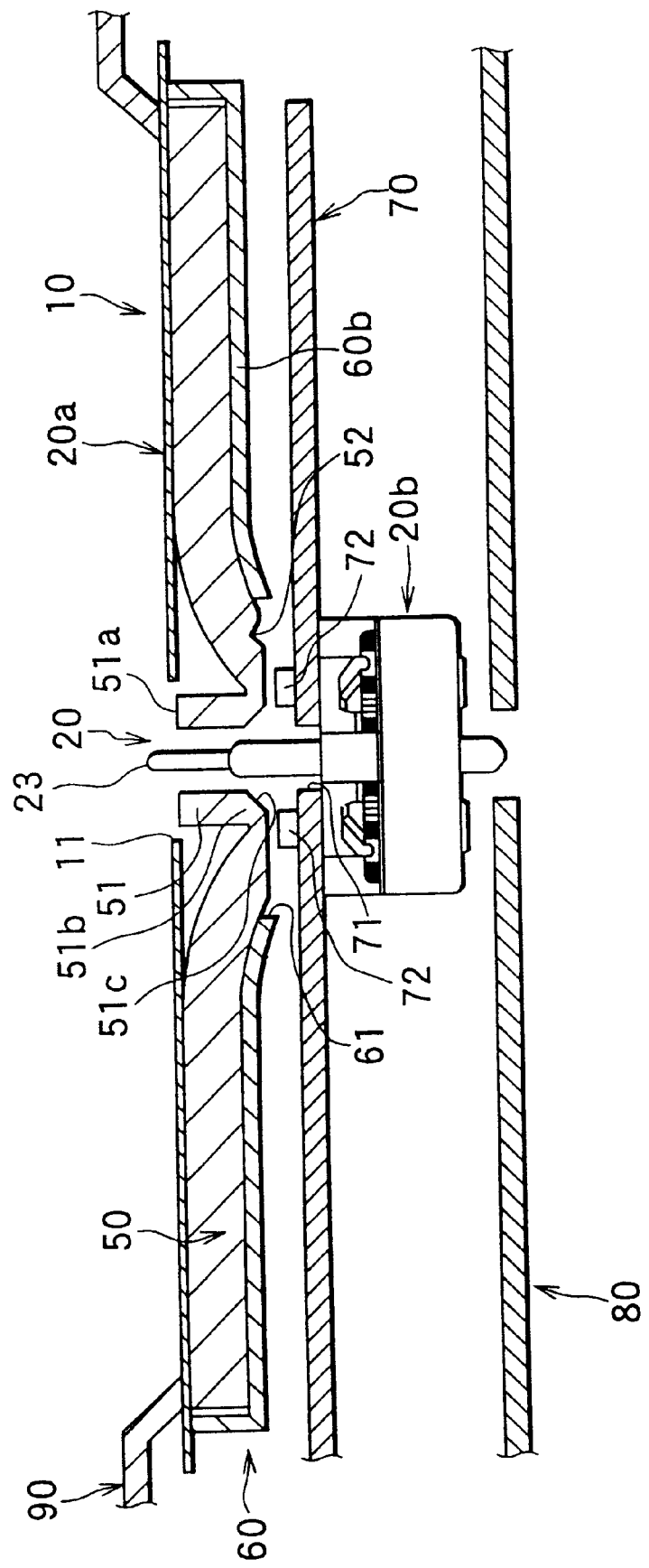

Referring now to FIGS. 1 to 3, the present invention is shown in conjunction with a vehicle combination meter.

This combination meter is disposed on an instrument panel within a vehicle compartment of a relevant automobile, and this combination meter, as illustrated in FIGS. 1 to 3, is equipped with a instrument board 10, and a tachometer 20, an indicator 30, and a speed meter 40 each of which is disposed on the instrument board 10.

In FIG. 1, the tachometer 20 is equipped with a graduated board 20a formed on the instrument board 10. A rotating machine 20b is provided on the reverse surface side of the instrument board 10, at a position corresponding to the graduated board 20a. For direction purposes, a reverse surface is a position opposite the visual display side of the display. The graduated board 20a is provided on the illustrated right side portion in FIG. 1 of the instrument board 10. Other than the graduated board 20a and an indicator portion 30a, the graduated board 40a is preferably colored black.

The graduated board 20a is equipped with a substantially circular-arc like graduated portion 21 that indicates the engine RPM. Moreover, the graduates and numerals of graduated portion 21 are colored black. Also, graduated board 20a is arranged to transmit light except for the graduates and numerals of graduated portion 21.

Rotating machine 20b has a drive portion 22, and an indicator shaft 23. The indicator shaft 23 rotatably extends upward from the drive portion 22, passing through through-hole portion 71 of circuit board 70, an opening portion 61 of a holder 60, a cylindrical. portion 51 of a light-guiding portion 50, and a through-hole portion 11 of the instrument board 10 (that also serves concurrently as a through-hole portion of the graduated board 20a). However, the rotating machine 20b is supported within a casing 80. It is to be noted that the drive portion 22 causes the indicator shaft 23 to rotate according to the electromagnetic force corresponding to the input. Also, the casing 80 is coaxially assembled to an annular end plate 90 via the circuit board 70, holder 60, light-guiding plate 50, and instrument board 10.

Also, the tachometer 20 is equipped with a light-emitting indicator 20c having an indicator main body 24 and a cover 25. The indicator main body 24 is longitudinally formed of transparent light-guiding resin material and supported by a forward end portion of the indicator shaft 23 via a boss of its rotating base portion 24a. As illustrated in FIG. 2, rotating base portion 24a is equipped with an inclined surface 24b which reflects light.

Cover 25 covers the indicator main body 24 and has a slit 25a on an upper wall corresponding to an upper surface of an indicator portion 24c. As such, in indicator 20c, when light enters rotating base portion 24a from a reverse surface thereof, this light is reflected by the inclined surface 24b into the indicator portion 24c. The light within the indicator portion 24c then exits through slit 25a of the cover 25. Thus, indicator portion 24c is illuminated from the slit 25a. Balancer 26 is also shown in FIG. 2.

Light-guiding plate 50 is disposed on the instrument board 10 along a reverse surface thereof and is integrally equipped with the above-described cylindrical portion 51. Cylindrical portion 51 is located beneath through-hole portion 11 of the graduated board 20a and coaxially with the indicator shaft 23 to permit the indicator shaft 23 to be inserted therethrough: Cylindrical portion 51 faces, with its upper end surface 51a, the opposite surface of rotating base portion 24a of the light-emitting indicator 20c through through-hole portion 11 and the opening portion 25b of the cover 25. Cylindrical portion 51 reflects light, entering its lower portion 51b from around the cylindrical portion 51, upward with reflecting surface 51c. Reflecting surface 51c has a tapered section which is incident from the upper end surface 51a upon the rotating base portion 24a of the indicator main body 24. Here, reflecting surface 51c, as illustrated in FIG. 2 and FIG. 3, is formed to go along the inner-peripheral surface of the lower portion 51b of the cylindrical portion 51 and upwardly converge.

Also, the light-guiding plate 50, at its cylindrical portion 51, is formed with a lower holder portion 60b, into a converging shape as shown in FIG. 2. As a result of this, light incident from around the cylindrical portion 51 upon the interior of the light-guiding plate 50, is incident upon the interior of the lower portion 51b. as well as an outer-peripheral side portion of the cylindrical portion 51 other than the cylindrical portion 51. The light-guiding plate 50 is formed of light guiding resin material.

The holder 60, as illustrated in FIG. 2, is equipped with an annular frame 60a and a holder portion 60b formed at an end of annular frame 60a. The holder portion 60b accommodates therein the light-guiding plate 50, and also plays the role of reflecting the light within this light-guiding plate 50 toward the interior of the light-guiding plate.

Wiring board 70 is clamped between casing 80 and holder 60, and is located along the drive portion 22 and in parallel with the instrument board 10. In this embodiment, the wiring board 70 is constructed of a printed board.

Five light-emitting elements 72 constituting a first light source are provided on a surface of the wiring board 70 at intervals spaced from each other. As a result, they face around cylindrical portion 51 of the light-guiding plate 50 through the opening portion 61 of the holder 60b. Light-emitting elements 72 cause light to enter from below and toward the cylindrical portion 51 of the light-guiding plate 50 and the surrounding area through the opening portion 61 of the holder portion 60b. As a result, light from the respective light-emitting elements 72 enter cylindrical portion 51 of the light-guiding plate 50 and its outer-peripheral side portion. The respective light-emitting elements 72 are located at positions spaced at approximately equal distances from the indicator shaft 23 in the radial direction.

Also, a light-emitting element 73, constituting a second light source, is provided on the surface of the wiring board 70, opposite a concavity portion 52. There is an opening portion 61 of the holder portion 60b. Light-emitting element 73 provides light into a portion of the light-guiding plate 50, other than through the cylindrical portion 51. Here, concavity 52 has a V shape section proximate the reverse surface of the light-guiding plate 50. Concavity 52 is situated on an inner-peripheral side of the opening 61 of the holder 60b. However, the configuration of concavity 52 is not limited to a V-shape, but may be any shape which introduces light from light-emitting element 73 into the light-guiding plate 50. In this embodiment, each of the respective light-emitting elements 72 and 73 is constructed of a light-emitting diode.

Speed meter 40 is constructed in substantially the same way as the tachometer 20. Accordingly, vehicle speed meter 40 has a graduated board 40a formed on the instrument board 10, a rotating machine disposed on a reverse surface side of the instrument board 10, and a light-emitting indicator 40c supported by a forward end portion of an indicator shaft. The indicator shaft extends from the rotating machine in substantially the same way as in indicator shaft 23. The graduated board 40a is equipped with a display pattern portion 41 for displaying the vehicle speed of an automobile.

The indicator 30 is equipped with an indicator portion 30a formed on the instrument board 10. A front panel 100 having a black face is also provided. Also, in this embodiment, the respective light-emitting elements 72, 73 and rotating machine 20b and the rotating inside machine 20b of the speed meter 40 are electrically connected to the wiring of the wiring board 70. It is to be noted that the front panel 100 is formed of smoke material having a transmittance of approximately 20%.

In this embodiment, using tachometer 20 for example, each of the light-emitting elements 72 transmits light into indicator main body 24. This light travels to rotating base portion 24a, through the cylindrical portion 71 of the light-guiding plate 50 and. through-hole 11. Light also enters the graduated board 20a through the portion other than the cylindrical portion 51 of the light-guiding plate 50. As such, each of the respective light-emitting elements 72 that constitute the first light source illuminates both for the light-emitting indicator 20c and the graduated board 20a.

As a result, even when insufficient light from the respective light-emitting elements 72, compared to light from light-emitting elements 72 entering light-emitting indicator 20c, enters the graduated board 20a, the light-emitting element 73 compensates for the illumination insufficiency of graduated board 20a. Accordingly, graduated board 20a and indicator 20c are properly illuminated even with the black face of front panel 100.

It is to be noted that the wiring board 70 is not limited to the printed board and may be of any type of circuit board enabling the wiring and connection in general. Also, the present invention is not limited to a combination meter but may be applied to a measuring instrument with a speed meter only or an instrument with a tachometer only. Moreover, the light-emitting elements are not limited to light-emitting diodes, and may be, for example, light-emitting elements such as lamps, coldcathode tubes, or electro-luminescence element. Also, the number of light-emitting elements 72 or 73 is not limited to five, and may be changed. Also the number of concave areas 52 may also be changed corresponding to the number of the light-emitting elements 73.

Also, even when forming a through-hole in the light-guiding plate 50 in place of the cylindrical portion 51, an inner-peripheral surface may be formed such that it downwardly converges. This causes the light of each light-emitting element 72 to directly enter the rotating base portion 24a through the through-hole portion and causes the light incident upon the light-guiding plate 50 at around this through-hole portion from each light-emitting element 72 to be reflected by said inner-peripheral surface into the light-guiding plate 50. It is possible to achieve substantially the same function and effect as those attainable with the above-described embodiment. Lastly, the present invention is not limited to automobiles, but may be applied to measuring instruments having indicators for use. on various kinds of vehicles. Also the invention may be applied to measuring instruments with indicators for use on general industrial machinery and tools.

While the above-described embodiments refer to examples of usage of the present invention, it is understood that the present invention may be applied to other usage, modifications and variations of the same, and is not limited to the disclosure provided herein.

What is claimed is:

1. A measuring instrument with an indicator comprising:
   at least one light-transmitting graduated board;
   a light-guiding plate provided along a reverse surface of the graduated board;
   a rotating machine provided on a reverse-surface side of the light-guiding plate and having an indicator shaft rotatably mounted and passing through a through-hole portion of the light-guiding plate and a through-hole portion of said graduated board;
   at least one light-emitting indicator supported at a forward end portion of said indicator shaft by a rotating base portion to rotate along a surface of said graduated board;
   a first light source disposed on a reverse-surface side of said light-guiding plate around said indicator shaft and projecting light into the light-emitting indicator from the rotating base portion through said through-hole portion of the light-guiding plate and said through-hole portion of the graduated board, said first light source projecting light into said graduated board through said light-guiding plate; and
   a second light source disposed at a position outwardly spaced from said indicator shaft with respect to said first light source in a radial direction, said second light source projecting light into said graduated board through said light-guiding plate, wherein said second light source is provided closer to the indicator shaft or to the first light source than to a graduated portion or to a display portion of the graduated board to provide a more uniformly lit graduated board.

2. A measuring instrument with an indicator comprising:
   at least one light-transmitting graduated board;
   a light-guiding plate provided along a reverse surface of the graduated board;
   a rotating machine provided on a reverse-surface side of the light-guiding plate and having an indicator shaft rotatably mounted and passing through a through-hole portion of the light-guiding plate and a through-hole portion of said graduated board;
   at least a light-emitting indicator supported at a forward end portion of said indicator shaft by a rotating base portion to rotate along a surface of said graduated board;
   a black face attached on said graduated board by an end plate to oppose the surface of said graduated board and said light-emitting indicator;
   a first light source disposed on a reverse-surface side of said light-guiding plate around said indicator shaft that projects light into the light-emitting indicator from the rotating base portion through said through-hole portion of the light-guiding plate and said through-hole portion of the graduated board, said first light source projecting light into said graduated board through said light-guiding plate; and
   a second light source disposed at a position outwardly spaced from said indicator shaft in a radial direction with respect to said first light source, said second light source projecting light into said graduated board through said light-guiding plate, wherein said second light source is provided closer to the indicator shaft or to the first light source than to a graduated portion or to a display pattern portion of the graduated board to provide a more uniformly lit graduated board.

3. A measuring instrument with an indicator according to claim 1, wherein said first light source is a plurality of light-emitting elements disposed around said indicator shaft at substantially equal distances from the indicator shaft in a radial direction; and
   said second light source is a single light-emitting element.

4. A measuring instrument with an indicator according to claim 3, wherein said light-guiding plate has a concave portion facing said second light source; and said second light source projects light into said concave portion before projecting light into the graduated board through said light-guiding plate.

5. A measuring instrument with an indicator according to claim 3, wherein a wiring board provided along a reverse surface of said light-guiding plate; and said light-emitting elements of said first light source are light-emitting diodes provided on said wiring board and electrically connected to the wiring board along with said rotating machine.

6. A measuring instrument with an indicator comprising:

at least one light-transmitting graduated board;

a light-guiding plate provided along a reverse surface of the graduated board;

a rotating machine provided on a reverse-surface side of the light-guiding plate and having an indicator shaft rotatably mounted and passing through a through-hole portion of the light-guiding plate and a through-hole portion of said graduated board;

at least one light-emitting indicator supported at a forward end portion of said indicator shaft by a rotating base portion to rotate along a surface of said graduated board;

a first light source disposed on a reverse-surface side of said light-guiding plate around said indicator shaft and projecting light into the light-emitting indicator from the rotating base portion through said through-hole portion of the light-guiding plate and said through-hole portion of the graduated board, said first light source projecting light into said graduated board through said light-guiding plate;

a second light source disposed at a position outwardly spaced from said indicator shaft with respect to said first light source in a radial direction, said second tight source projecting light into said graduated board through said light-guiding plate and illuminating only the graduated board, a wiring board provided along a reverse surface of said light-guiding plate;

said first light source being a plurality of light-emitting elements provided on said wiring board and electrically connected to the wiring board;

said second light source being a single light-emitting element provided on said wiring board and electrically connected to said wiring board; and said rotating machine being electrically connected to said wiring board.

7. A measuring instrument with an indicator according to claim 6, wherein said first light source including light-emitting diodes disposed around said indicator shaft at substantially equal radial distances from the indicator shaft; and said second light source is a light-emitting diode.

8. A measuring instrument with an indicator comprising:

an indicator;

a shaft attached to the indicator;

a light guiding plate defining a through hole for accepting a portion of the shaft, the shaft further passing through a circuit board and into a drive portion, the light guiding plate further defining a concavity and a reflecting portion located adjacent to the shaft;

a lower holder portion to support the light guiding plate, the lower holder portion defining a through hole to expose the concavity and the reflecting portion;

a cylindrical portion of the light guiding plate surrounding the shaft, wherein the cylindrical portion is thicker than a non-cylindrical portion of the light guiding plate;

a first light source located on the circuit board and further located adjacent to the shaft; and a second light source located on the circuit board and further located adjacent to the first light source, wherein the lower holder portion restricts light from passing through portions of the light guiding plate and permits light to pass through the light guiding plate adjacent to the shaft, wherein the first and second light sources are positioned to emit light into the light guiding plate via the concavity and non-concavity portions in order to illuminate a graduated board located against the light guiding plate on a side opposite to the lower holder portion, wherein the concavity redirects reflected light from a first concavity wall to a second concavity wall for passage into the light guiding plate.

9. A measuring instrument with an indicator according to claim 8, wherein:

the first light source comprises a plurality of light-emitting elements radially and substantially equidistantly disposed around the shaft; and the second light source comprises a single light-emitting element.

10. A measuring instrument with an indicator according to claim 8, wherein:

the first light source includes a plurality of light-emitting diodes radially and substantially equidistantly disposed around the shaft; and the second light source is a light-emitting diode.

* * * * *